United States Patent
Bovet (10) Patent No.: US 8,160,572 B2
(45) Date of Patent: Apr. 17, 2012

(54) PLATFORM TEST ENVIRONMENT AND UNIT TEST FRAMEWORK FOR A TELECOMMUNICATIONS GATEWAY

(75) Inventor: Jean Bovet, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 496 days.

(21) Appl. No.: 12/363,472

(22) Filed: Jan. 30, 2009

(65) Prior Publication Data

US 2010/0197296 A1 Aug. 5, 2010

(51) Int. Cl.
*H04W 24/00* (2009.01)
(52) U.S. Cl. .................................. 455/424; 455/423
(58) Field of Classification Search .................. 455/423; 709/224, 203, 229, 227; 714/25, E11.173; 701/2, 3; 380/270; 340/531
See application file for complete search history.

(56) References Cited

U.S. PATENT DOCUMENTS

| 7,575,558 | B2 * | 8/2009 | Boecker et al. | 600/573 |
| 7,886,350 | B2 * | 2/2011 | Ormazabal | 726/11 |
| 2003/0069957 | A1 * | 4/2003 | Malmskog et al. | 709/223 |
| 2003/0229529 | A1 * | 12/2003 | Mui et al. | 705/8 |
| 2004/0133880 | A1 * | 7/2004 | Paternostro et al. | 717/124 |
| 2006/0080638 | A1 * | 4/2006 | Fiore | 717/104 |
| 2007/0110219 | A1 * | 5/2007 | Wu et al. | 379/13 |
| 2008/0118038 | A1 * | 5/2008 | Lien | 379/26.01 |
| 2009/0113250 | A1 * | 4/2009 | Meijer et al. | 714/43 |
| 2009/0158255 | A1 * | 6/2009 | Yoon et al. | 717/124 |

* cited by examiner

*Primary Examiner* — Nick Corsaro
*Assistant Examiner* — Mahendra Patel
(74) *Attorney, Agent, or Firm* — Fliesler Meyer LLP (57) ABSTRACT

A platform test environment is described for testing the functionality of a gateway. The platform includes a number of clients that simulate the functionality of a service provider application and a number of simulators that simulate the functionality of a telecommunications network component. These clients and simulators can be used to test functionality within a gateway that manages request traffic between the application(s) and the telecommunications network component(s). Once the platform test environment is configured, it can be used to execute a series of testing operations on the gateway by transmitting requests between the clients and simulators via the gateway. Furthermore, a unit test framework is provided that can be used to generate unit tests for the platform environment. These unit tests can be used to input data into the system, obtain a set of results and compare the results to expected values.

16 Claims, 5 Drawing Sheets

PLATFORM TEST ENVIRONMENT AND UNIT TEST FRAMEWORK FOR A TELECOMMUNICATIONS GATEWAY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to testing and telecommunications and more specifically to providing testing and simulation tools for a telecommunication services gateway.

BACKGROUND

Given the recent dramatic growth in wireless and cellular communications, more and more businesses and other entities are integrating themselves with mobile device technologies. In addition to standard voice features, modern cellular phones and similar devices provide countless other services, such as internet access, email, short messaging service (SMS) texting, digital cameras, multimedia messaging service (MMS), Bluetooth, gaming, various web-based applications and the like. As a result, telecommunication carriers and network operators have been under increased pressure to provide more and more service offerings to their subscribers. Today's network operator wants to attract new and retain customers, develop profitable new business models, improve returns and launch new services as quickly as possible. In addition, the possible competitive pressures from other entities such as internet-based providers have been a growing area of concern in this field.

Faced with these challenges, most operators expect a drastic increase in their portfolio of content and application offerings, from a handful now, to thousands and possibly even millions in the future. While some of these offerings will be developed and deployed in house, the vast majority of these new applications will likely be sourced from partners, Web applications such as social networking sites and third party service providers. These outsourced services will be deployed and executed outside of the carrier's internal network, thereby creating new challenges in security, integration and management of the environment.

To assist with these challenges, new telecommunication gateways and software applications have emerged, which are typically deployed by the network operator as part of a service development platform (SDP). These gateways usually provide features for managing the ecosystem between the operator, its internal subscriber network and various third party providers. For example, a communication services gateway may help to secure third party access to the operator's core network, provide service level agreement (SLA) enforcement, as well as perform numerous other functions.

These service access gateways have greatly simplified the management and control of accessing the telecom network by various third party service providers. However, there still exists significant room for improvement in terms of upgrades, testing and simulation tools for gateway functionality. For example, in many instances it can be desirable to simulate the real world conditions prior to actually deploying a new version of a component or feature in the gateway. It is also desirable to integrate all of the information obtained from various sources during the testing of new features in a unified manner and to provide access thereto

SUMMARY OF INVENTION

In the present disclosure, systems and methods are described for providing a platform test environment (PTE) in order to test the functionality of various components in a telecommunications gateway. The gateway can also be completely provisioned by the PTE thereby obtaining a fully automated test suite.

In the various embodiments, the platform includes a number of clients that simulate the functionality of a service provider application and a number of simulators that simulate the functionality of a telecommunications network component. These clients and simulators can be used to test functionality within a gateway or other component that manages request traffic between the application(s) and the telecommunications network component(s). As an illustration, the platform test environment can be used to execute a series of testing operations on the gateway by transmitting requests between the clients and simulators via the gateway. The results and various other data associated with these communications can then be inspected in order to analyze the performance of a particular feature or extension prior to actual production deployment.

In addition, a unit test framework is provided that can be used to generate unit tests for the platform environment. These unit tests can be used to input data into the system, obtain a set of results and compare the results to expected values, all of which can be performed automatically. The unit tests can also be persisted in memory, such that they need only be created once.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with the embodiments of the invention, systems and methods are described for testing the functionality of a telecommunications gateway, as well as provisioning the gateway. A platform test environment is provided that includes a set of clients and a set of network simulators. The clients simulate the functions of a service provider application (e.g. a web application) and the simulators simulate the functions of a telecommunications network component, such as a short messaging service center (SMS-C). The gateway manages the communications between the various service provider applications and the telecommunications operator network.

In various embodiments, the platform test environment (PTE) can be used to execute various testing operations on the gateway by transmitting requests between the clients and the simulators. For example, the PTE can be used to test the functionality of an extension to the gateway, such as a new exposure service. In various embodiments, exposure services are an integral part of the gateway that perform the translation logic between the different protocols used by the service provider application and the network components. For example, a particular exposure service can translate invocations between web services and a network-specific protocol, such as open service access (OSA) or session initiation protocol (SIP). In various embodiments, new extension exposure services can be added to the gateway as needed, and the platform test environment can be employed to test the functionality of these new exposure services by using the PTE custom modules.

Moreover, the PTE can be used to completely provision the gateway. This feature can be used in periodically (e.g. nightly) testing the gateway to obtain a fully automated test suite. The results of the periodic tests could then be presented in HTML format with information about any failures and successes, along with graphics for the duration tests (displaying throughput).

In addition, a unit test framework is provided that can be used to generate unit tests for the platform test environment. Unit tests are typically a core part of any testing cycle. Data is input into the system, the results are retrieved from the system and compared to expected values, all programmatically. The unit test framework enables the user to easily create unit tests for the PTE. In various embodiments, this can be performed by implementing a test class based on an abstract class provided by the unit testing framework. This hides from the developer the detailed and tedious work of establishing the JMX connection and invoking the correct MBean. The unit testing framework can also manage the mechanics of connecting to the PTE.

In various embodiments, the steps to creating a unit test for the platform test environment include:
   a. Creating any necessary client or simulator modules for the PT using the various service provider interface (SPI) and extensible markup language (XML) files;
   b. Implementing a test class based on the abstract class provided by the unit testing framework;
   c. Provisioning the gateway;
   d. Starting the platform test environment and loading the modules; and
   e. Executing the test class.

In this manner, the platform testing environment can support the end-to-end development of communication services, including generation, unit testing and execution in a comprehensive simulation environment. The PTE covers all aspects of simulation, including client behavior, ability to automate testing for custom extensions and simulate the network in a pre-production environment without impacting existing systems.

In addition to the simulation components described above, the PTE can also include the following features:
   a. An Event Data Record (EDR) Java Messaging Service (JMS) listener—this listener can be used to register and listen to specified EDRs generated by the gateway. It can also provide dynamic filtering and export for offline analysis.
   b. An MBean browser—this browser can be used to provision and gather info from the gateway. The browser can be recordable and re-playable and can display the information in a flat view or tree view.
   c. A server log listener—this listener can be used to simplify the logging functions of the gateway and to avoid the need to open the log files.
   d. A database browser—This browser can display binary value in the database to the user in human readable format. It can also be used to execute Standard Query Language (SQL) commands.
   e. A Service Level Agreement (SLA) editor—this editor provides the ability to edit the XML-based SLA in a user friendly interface and to upload/download the SLAs to the gateway.

Figure 1:
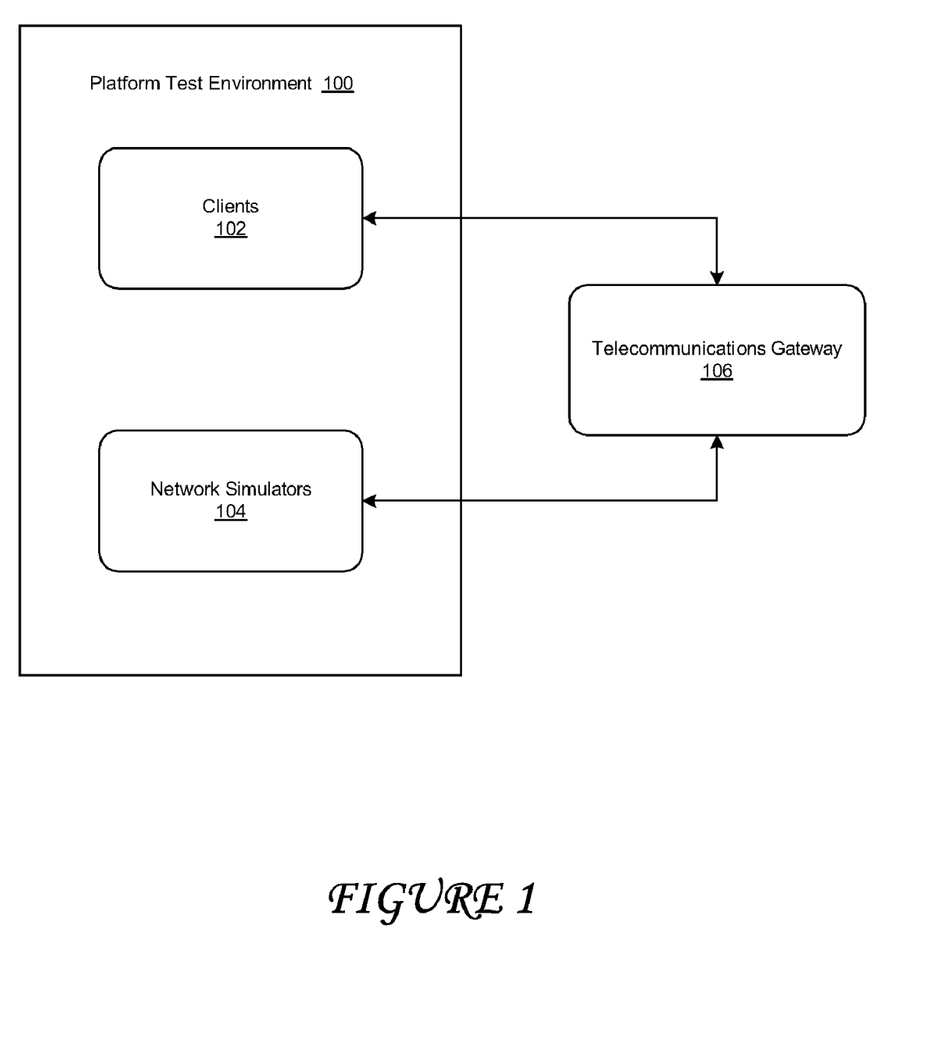
FIG. 1 is a high level illustration of the platform testing environment, in accordance with various embodiments of the invention.

FIG. 1 is a high level illustration of the platform testing environment, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As shown in the figure, the platform testing environment (PTE) 100 includes a set of clients 102 and simulators 104 that communicate with each other via the telecommunications gateway 106. As an illustration, the clients 102 can send request invocations to the telecommunications gateway and receive responses from the network simulators 104. Similarly, the simulators can initiate communications with the clients by sending communications to the gateway. All of these communications can be used to test the functions performed by the gateway. Thus, when a particular component (e.g. new exposure service) of the gateway needs to be tested, the PTE 100 can provide a simple and automated way to verify that the functionality of that component performs as expected.

Figure 2:
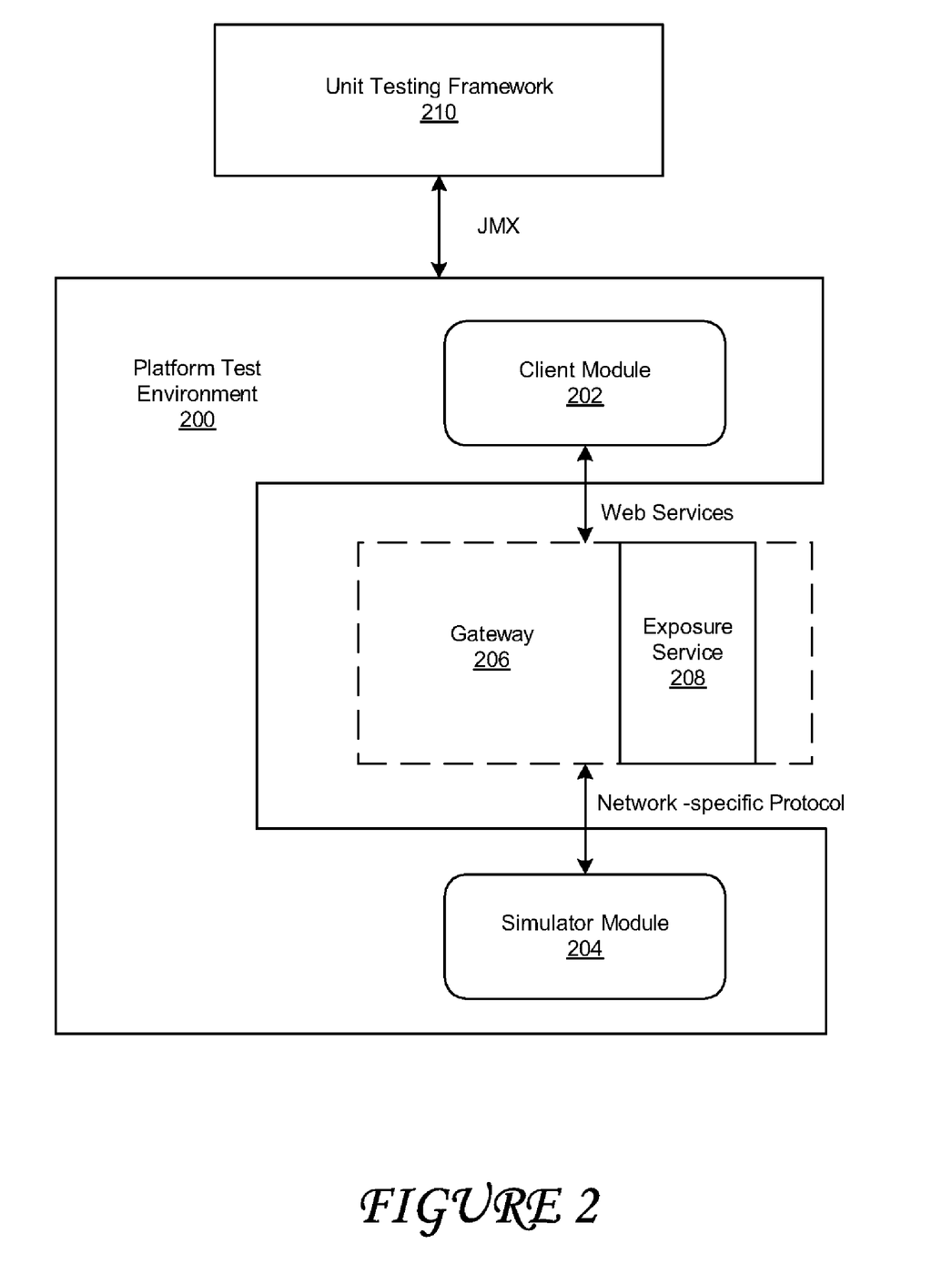
FIG. 2 is another illustration of the platform testing environment, in accordance with various embodiments of the invention.

FIG. 2 is another illustration of the platform testing environment, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated in the figure, the PTE 200 can be viewed as a pluggable framework to test the functional units of a telecommunications gateway 206. For example, the client module 202 and the simulator 204 can be used to test an extension exposure service 208 of the gateway. In the embodiment shown, the client communicates with the gateway via a web services protocol and the network simulator communicates via a network-specific protocol (e.g. SS7).

In the context of the PTE, a client is made up of one or more modules. Each module represents one operation belonging to a set of interfaces. For example, a client can represent the functionality offered by the Parlay X 2.1 Short Messaging set of interfaces. A module would then represent the client that executes a single operation from that particular interface. For example, the module may represent the operation "sendSms." The modules can be configured with various parameters and may also have dependencies on other modules or other components. In various embodiments, multiple modules can be strung together into an automated set.

Similarly, a network simulator can be comprised of one or more modules. These modules can each perform a network-initiated operation in order to enable the proper communication and testing via the gateway. It should be noted that while it is possible to execute a single operation from the client configuration screen, it will usually be preferable to string together a set of actions, including setting up client and simulator modules, and executing operations into a single automated test sequence. These test sequences can be automatically persisted into memory, such that a user would need to create a test only once.

In addition, the PTE 200 can expose a service provider interface (SPI) for creating custom modules. The SPI can be used to create additional modules, such as simulators or clients, for testing extensions. In one embodiment, there can be a distinction between modules for operations that simply execute and return and those for operations that start a process which runs until it is turned off. These are referred to as stateless and stateful modules respectively. In various embodiments, a stateless module would implement the CustomStatelessModule SPI and the stateful modules would implement the CustomStatefulModule SPI. Additionally, a set of optional interfaces can be implemented to display results (e.g. a notification, a message from the network delivered to a client Web Service) or provide statistics in a graphical user interface (GUI). In various embodiments, a stateful module can be executed by the PTE invoking a prepare method, followed by a start method and then later invoking a stop method. For stateless SPI, the PTE can merely invoke the prepare method followed by the execute method.

Continuing with the illustration in the figure, the PTE can also provide a unit testing framework 210. In various embodiments, unit tests are a core part of a testing cycle. The unit test can input data, obtain results and compare them to a set of expected values automatically. The unit testing framework 210 is used to create the unit tests by providing an abstract class and managing the connectivity to the platform test environment 200. In order to create a unit test, the user can implement the abstract test class and execute it once the PTE is up and running.

Figure 3:
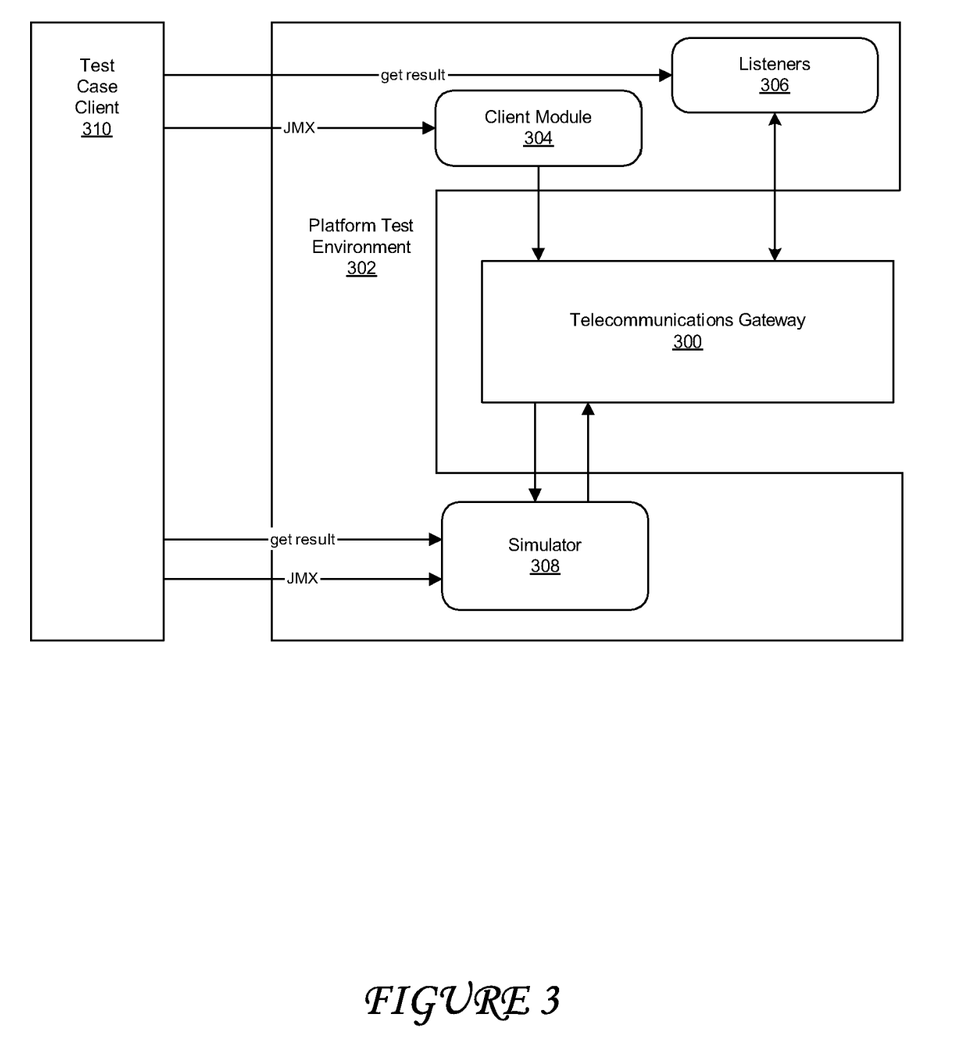
FIG. 3 is an illustration of a test case client in the context of the platform test environment, in accordance with various embodiments of the invention.

FIG. 3 is an illustration of a test case client in the context of the platform test environment, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a test case client 310 created using the unit test framework can invoke the Java Management Extension (JMX) call on the client module 304 in the PTE 302 to initiate a southbound (simulated network-bound) request to a network simulator 308. The test case client 310 can also obtain the results of the request from the simulator 308.

Similarly, the test case client can also initiate a northbound (simulated mobile-originated) request by invoking an appropriate JMX call on the network simulator. This request would be sent to the gateway 300, which can also notify any listeners 306 that are registered with the gateway. The test case client can also obtain the results from the listeners (e.g. via another JMX call).

Figure 4:
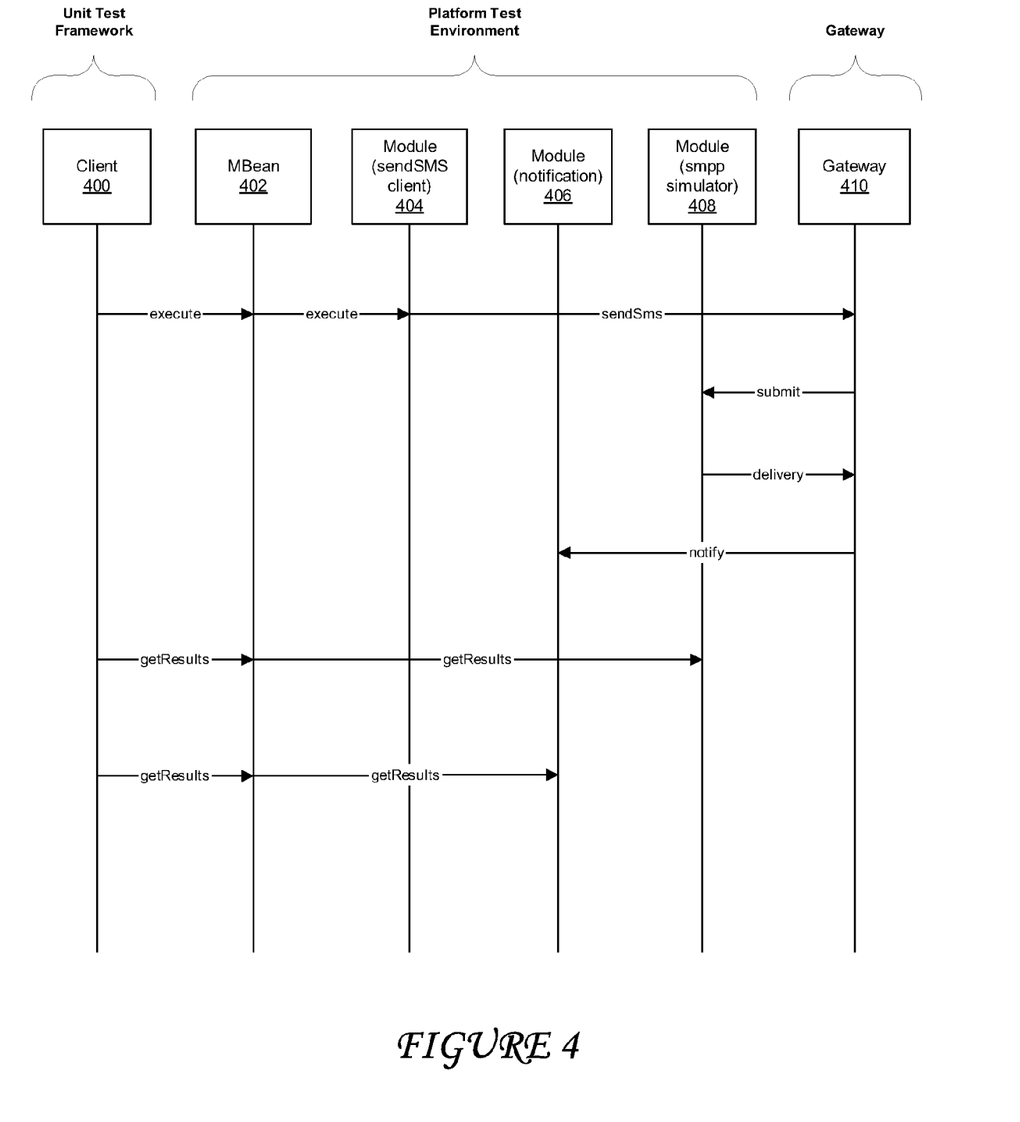
FIG. 4 is an example of a short messaging service (SMS) unit test sequence, in accordance with various embodiments of the invention.

FIG. 4 is an example of a short messaging service (SMS) unit test sequence, in accordance with various embodiments of the invention. Although this figure depicts functional steps in a particular sequence and between particular components for purposes of illustration, the process is not necessarily limited to this particular order, steps or components. The illustrated process can add, omit, and rearrange various steps and/or components within the scope of the embodiments described herein.

As illustrated, a test client 400 calls an execute method on the PTE's Module Management MBean 402. The mechanics of the JMX call are handled by the base class provided by the unit test framework. The MBean 402 calls execute on the specified module, in this case the sendSms client 404. The request can include a request for delivery receipts.

The sendSms module 404 sends the request to the network gateway 410. The gateway 410 then processes the request and submits it to the network simulator module—in this case, the SMPP simulator module 408.

The simulator module returns a delivery receipt to the network gateway. The network gateway can send the receipt on to the notification module 406, which represents the client Web Service implementation.

The test client 400 can retrieve the result of the gateway's submit from the SMPP simulator 408. The test client 400 can then retrieve the delivery receipt from the notification module (shown as a getResults call to the notification module 406).

Figure 5:
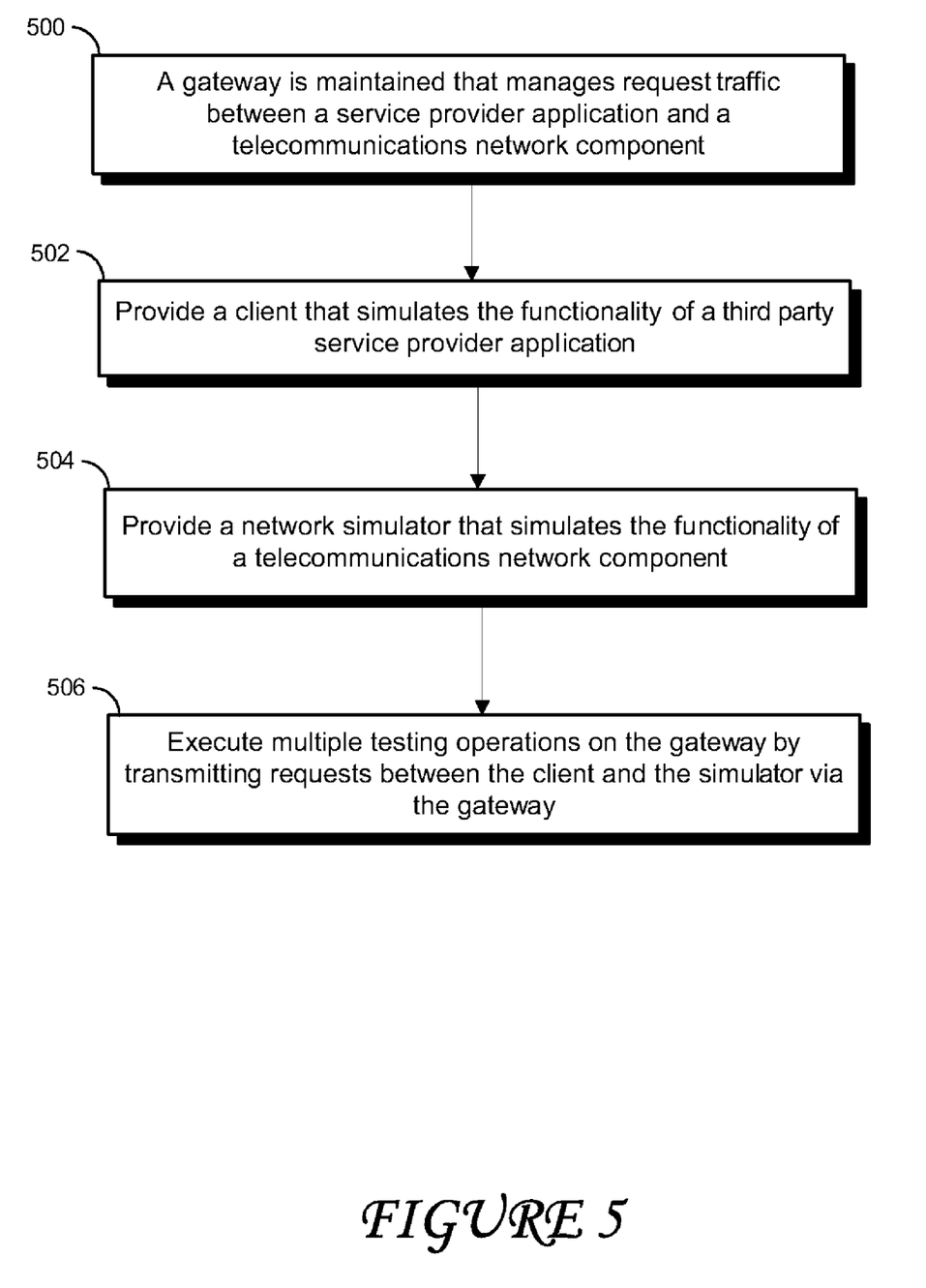
FIG. 5 is a flow chart diagram of a high level process for utilizing the platform test environment, in accordance with various embodiments of the invention.

FIG. 5 is a flow chart diagram of a high level process for utilizing the platform test environment, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, a gateway can be maintained for managing access to the telecommunications network. The gateway can be deployed for managing access between the internal network of the operator and any client and/or device that wishes to access that network. In one embodiment, the service access gateway is a set of software applications that perform some services to the requests flowing to/from the network. In alternative embodiments, the gateway can be implemented as hardware, firmware, or any combination thereof. In either case, the gateway can translate communications initiated by clients (e.g. Web applications) via Web services into the appropriate network-specific protocols and vice versa.

As a simple illustration of the use of telecommunications gateway, a web-based application may wish to access the network in order to provide a particular service (e.g. text-to-vote type feature, a live flight status update service for mobile phones, etc.). This service provider application may be offered by a third party with respect to the network operator and its subscribers. As such, the application may reside outside of the operator's internal network. Since there can be hundreds, or even thousands of such applications, a tool is desirable that can manage access to the operator's network by external entities, provide security and service level agreement (SLA) enforcement, as well as simplify access to the numerous network-specific protocols underlying the various communications. In one embodiment, the service access gateway performs these functions, as well as provides various other features for managing access to the telecom network.

In step 502, the platform test environment provides a client that simulates the functionality of a third party service provider application. For example, the client may send or receive an SMS text message to a particular mobile device connected to the network. In step 504, a network simulator is provided that simulates the functionality of a telecommunications network component. For example, the simulator may play the role of an SMS-C that communicates with the client application.

In step 506, a series of requests can be transmitted between the client and the simulator via the gateway. This may be done in order to test a particular functionality or extension in the gateway without actually having to deploy the extension to the live production environment. As an illustration, a new exposure service can be tested in the gateway before actually assuming communications between the network and the third party applications.

In various aspects, the embodiments described throughout this disclosure encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments also include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system, comprising:
a platform test environment which includes
one or more clients that simulate functions of a service provider application,
one or more simulators that simulate functions of a telecommunications network component, and
wherein each client comprises one or more modules, wherein each module includes a stateless module that executes an operation, and a stateful module that initiates a process that continues to execute until the process is terminated, and wherein each module performs a particular operation from an interface used by the service provider application;
a gateway that processes request traffic between the one or more clients and the one or more simulators, wherein the gateway includes at least one exposure service that translates invocations between a protocol of the service provider application and a different protocol of the telecommunications network component;
wherein the platform test environment is used to execute a series of testing operations on the gateway by transmitting request traffic between the one or more clients and the one or more simulators via said gateway; and
a unit testing framework that generates a unit test for the platform test environment, wherein the unit test is used to automatically input data into the platform test environment, retrieve a set of results, and compare said results to expected values.

2. The system of claim 1, wherein the platform test environment is used to test a new extension exposure service for the gateway.

3. The system of claim 1, wherein the one or more clients further include at least one of the following:
a messaging client, a call control client, a mobility client, a subscriber profile client, a session manager client, a partner relationship management client and a custom client.

4. The system of claim 1, wherein the one or more simulators further include a short message peer-to-peer (SMPP) simulator, an MM7 protocol simulator, a mobile location protocol (MLP) simulator, a push access protocol (PAP) simulator and an OSA simulator.

5. The system of claim 1, wherein the platform test environment further includes a service provider interface (SPI) used to create new custom modules for simulators or clients for testing one or more extensions.

6. The system of claim 1, wherein the platform test environment further includes an interface for accessing data of the results of the series of testing operations.

7. A method for testing functionality in a telecommunications environment, said method comprising:
provide one or more clients that simulate functions of a service provider application, wherein each client comprises one or more modules, wherein each module includes a stateless module that executes an operation, and a stateful module that initiates a process that continues to execute until the process is terminated, and wherein each module performs a particular operation from an interface used by the service provider application;
providing one or more simulators that simulate functions of a telecommunications network component;
maintaining a gateway that processes request traffic between the one or more clients and the one or more simulators, wherein the gateway includes at least one exposure service that translates invocations between a protocol of the service provider application and a different protocol of the telecommunications network component;
executing a series of testing operations on said gateway by transmitting one or more requests between the one or more clients and the one or more simulators via said gateway; and
providing a unit testing framework that generates a unit test for the platform test environment, wherein the unit test is used to automatically input data into the platform test environment, retrieve a set of results, and compare said results to expected values.

8. The method of claim 7, further comprising:
testing a new exposure service of the gateway by invoking the client and the simulator.

9. The method of claim 7, wherein the client further includes at least one of the following:
a messaging client, a call control client, a mobility client, a subscriber profile client, a session manager client, a partner relationship management client and a custom client.

10. The method of claim 7, wherein the simulator further includes at least one of: a short message peer-to-peer (SMPP) simulator, an MM7 protocol simulator, a mobile location protocol (MLP) simulator, a push access protocol (PAP) simulator and an OSA simulator.

11. The method of claim 7, wherein the platform test environment further includes a service provider interface (SPI) used to create new custom modules for the simulator or the client in order to testing one or more extensions.

12. A non-transitory computer-readable medium carrying one or more sequences of instructions for testing functionality in a telecommunications environment, which instructions, when executed by one or more processors, cause the one or more processors to carry out the steps of:
providing one or more clients that simulate functions of a service provider application, wherein each client comprises one or more modules, wherein each module includes a stateless module that executes an operation, and a stateful module that initiates a process that continues to execute until the process is terminated, and wherein each module performs a particular operation from an interface used by the service provider application;
providing one or more simulators that simulate functions of a telecommunications network component;
maintaining a gateway that processes request traffic between the one or more clients and the one or more simulators, wherein the gateway includes at least one exposure service that translates invocations between a protocol of the service provider application and a different protocol of the telecommunications network component;
executing a series of testing operations on said gateway by transmitting one or more requests between the one or more clients and the one or more simulators via said gateway; and
providing a unit testing framework that generates a unit test for the platform test environment, wherein the unit test is used to automatically input data into the platform test environment, retrieve a set of results, and compare said results to expected values.

13. The system of claim 1, wherein results of the series of testing operations is displayed in a HTML format and includes information about any failures and successes of the series of testing operations.

14. The system of claim 1, wherein the unit test is performed by implementing a test class based on an abstract class provided by the unit test framework.

15. The method of claim 7, further comprising displaying the results of the series of testing operations is in a HTML format that includes information about any failures and successes of the series of testing operations.

16. The method of claim 7, wherein the unit test is performed by implementing a test class based on an abstract class provided by the unit test framework.

\* \* \* \* \*